United States Patent [19]
Davis

[11] Patent Number: 5,894,934
[45] Date of Patent: *Apr. 20, 1999

[54] MACHINE AND METHOD FOR SEPARATING RECYCLABLE MATTER

[75] Inventor: Robert M. Davis, Bonita, Calif.

[73] Assignee: CP Manufacturing, Inc., National City, Calif.

[*] Notice: This patent is subject to a terminal disclaimer.

[21] Appl. No.: 08/906,403

[22] Filed: Aug. 5, 1997

Related U.S. Application Data

[63] Continuation of application No. 08/665,946, Jun. 19, 1996, Pat. No. 5,722,542, which is a continuation of application No. 08/374,066, Jan. 18, 1995, Pat. No. 5,551,573, which is a continuation of application No. 08/218,353, Mar. 28, 1994, Pat. No. 5,452,804, which is a division of application No. 07/930,739, Aug. 14, 1992, Pat. No. 5,328,034.

[51] Int. Cl.$^6$ .................. B03C 1/30; B07B 9/00
[52] U.S. Cl. .................. 209/37; 209/38; 209/39; 209/139.1; 209/218; 209/221
[58] Field of Search .................. 209/12, 21, 3, 209/37, 38, 39, 138, 139.1, 143, 218, 221, 228, 231, 710, 930; 198/690.1

[56] References Cited

U.S. PATENT DOCUMENTS

| 345,383 | 7/1886 | Kessler | 209/218 |
|---|---|---|---|
| 707,088 | 8/1902 | Dings | 209/38 |
| 4,016,071 | 4/1977 | Paterson | 209/39 |
| 4,242,197 | 12/1980 | Voelskow et al. | 209/39 X |
| 4,354,930 | 10/1982 | Nakajima | 209/221 |
| 5,091,077 | 2/1992 | Williams | 209/12 |
| 5,328,034 | 7/1994 | Davis | 209/31 |
| 5,452,804 | 9/1995 | Davis | 209/38 |
| 5,551,573 | 9/1996 | Davis | 209/38 |

FOREIGN PATENT DOCUMENTS

5-169045  9/1993  Japan .

OTHER PUBLICATIONS

5-169045, English Translation of the Abstract of the Japanese Patent No. 5-169045, "Refuse Screening, Sorting and Recovering Device", Toho Sheet & Frame Co. Ltd.

*Primary Examiner*—Tuan N. Nguyen
*Attorney, Agent, or Firm*—Gray Cary Ware Freidenrich

[57] ABSTRACT

A machine for sorting recyclable matter includes a trommel for conducting and screening an input flow of recyclable matter and a magnetic mechanism coupled to the trommel for extracting magnetic material from the input flow while the trommel rotates. The input flow is dropped vertically from the trommel into a positive-pressure air separator which separates the flow into a first material stream including lightweight articles and a second material stream including relatively heavy articles. The heavy articles of the second material stream drop downwardly in the air separator. Padded baffles are provided in the air separator for reducing the downward velocity of the second material stream, which substantially lowers breakage of glass articles.

3 Claims, 3 Drawing Sheets

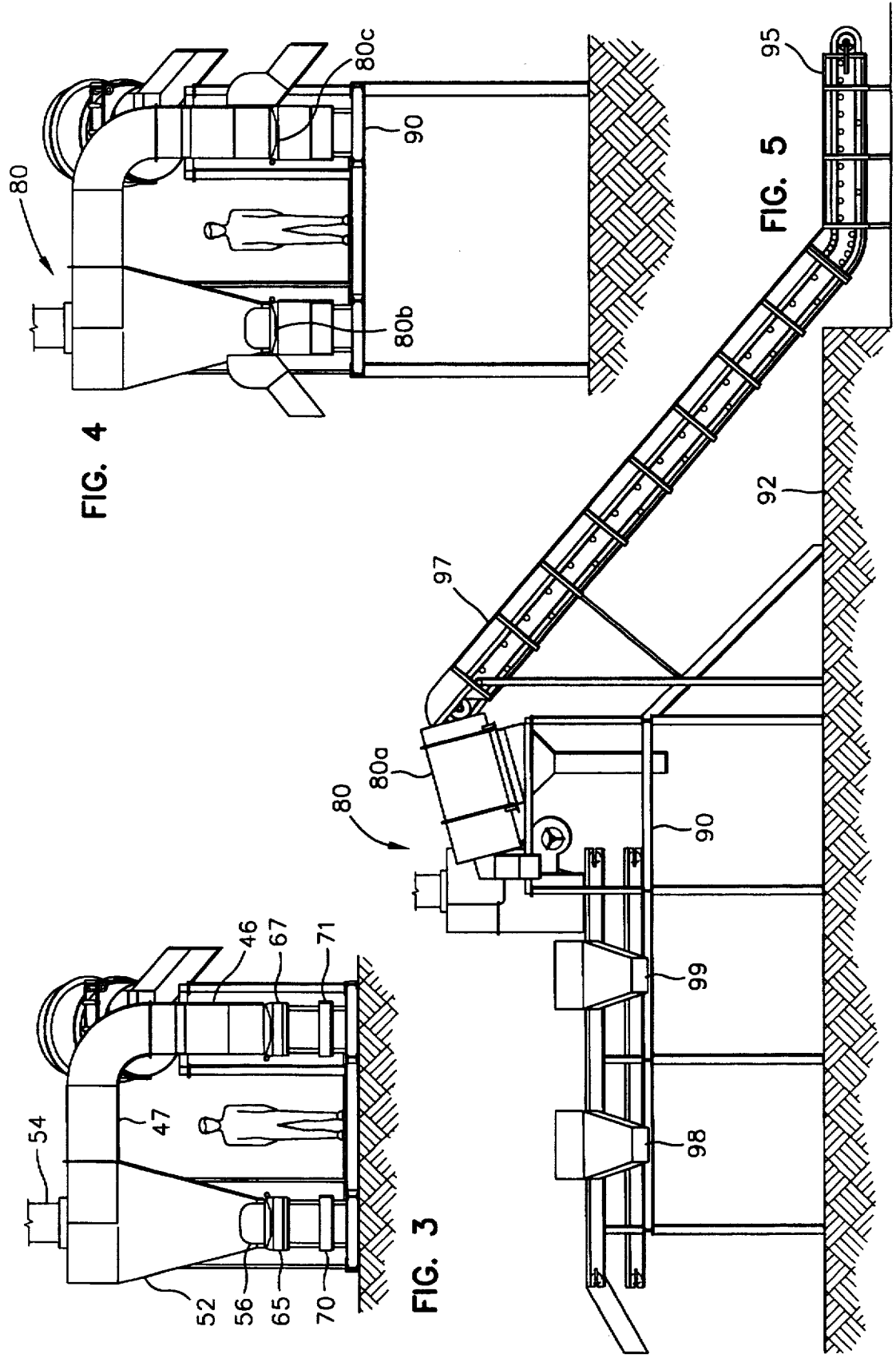

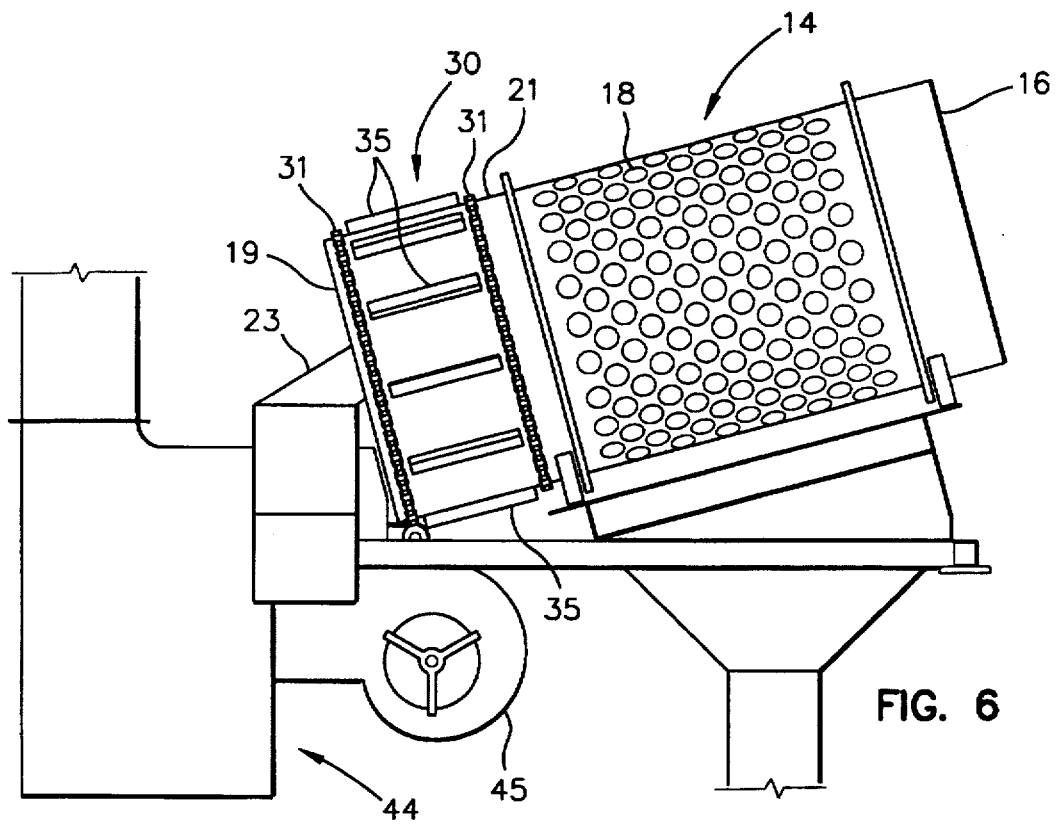
FIG. 6
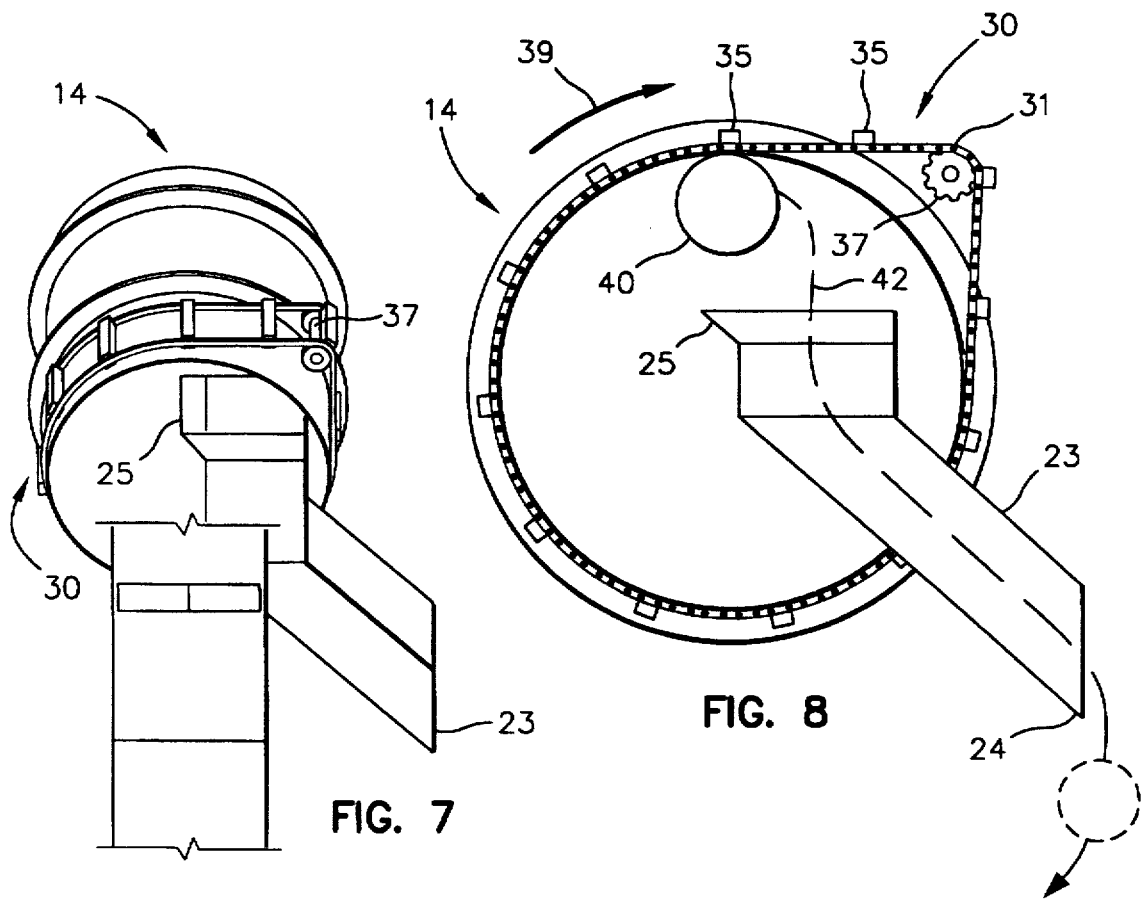
FIG. 7
FIG. 8

MACHINE AND METHOD FOR SEPARATING RECYCLABLE MATTER

This application is a continuation of U.S. patent application Ser. No. 08/665,946 filed Jun. 19, 1996 now U.S. Pat. No. 5,722,542, which was a continuation of U.S. patent application Ser. No. 08/374,066, filed Jan. 18, 1995 now U.S. Pat. No. 5,551,573, which was a continuation of U.S. patent application Ser. No. 08/218,353, filed Mar. 18, 1994 now U.S. Pat. No. 5,452,804, which was a divisional of U.S. patent application Ser. No. 07/930,739, filed Aug. 14, 1992, now U.S. Pat. No. 5,328,034.

BACKGROUNDS OF THE INVENTION

This invention concerns a machine for separating a heterogeneous flow of recyclable matter into respective separate streams of recyclable materal, with each stream including a respective homogenous class or classes of articles.

Machines are known which receive a heterogenous flow of recyclable matter and separate the flow into respective streams which include one or more homogenous classes of material. Presently, most of these machines separate the input flow into at least three separate material streams. The first stream includes magneto-responsive articles such as tin cans and ferrous scrap. The second stream consists of relatively light materials such as aluminum cans, plastic containers, and paper objects. The third stream includes relatively heavy articles such as glass containers, which are not responsive to a magnetizing force.

The known machines employ magnetic means to extract magneto-responsive materials. The resulting stream of recyclable matter is separated into the second and third streams by applying a high-velocity air flow, either in the form of a vacuum or a high-pressure air stream, to blow the lighter articles away from the heavier articles. The three streams are directed by these prior art machines to respective conveyor mechanisms for transport to sorting stations where human operators further classify and sort the streams.

Separator machines which are known in the art exhibit several significant disadvantages. First, most provide a stream of input matter which has been densified by collection, transport, and storage. The input stream is typically input to a separator machine on a conveyor, without having been loosened. This makes it more difficult to process the stream for separation and tends to retain small waste particles in the constituent materials, even after separation.

The relatively dense input flow leads to a second significant disadvantage of known separator machines. Such machines typically extract magneto-responsive articles relatively early in the separation process. Indeed, two such machines remove magneto-responsive articles at the top end of an inclined conveyor which carries the input stream. Early removal from a relatively dense stream frequently results in other articles being pulled out of the input stream with the magneto-responsive articles. Moreover, a dense and deep input stream can block or dislodge magneto-responsive articles from a magnetic extractor. Further, the mechanisms for extracting the magneto-responsive articles are large, expensive, and difficult to maintain.

A third significant disadvantage of known separator machines is the high breakage rate of glass containers. The glass containers normally are divided from other containers in an air separator which allows the glass containers to drop vertically. In such machines, glass containers are allowed to free-fall through the air separator mechanism to a conveyor. The conveyors move the glass containers at a relatively low speed, which results in falling glass containers impacting on other containers which are being transported by the conveyor. The result is a high frequency of glass-glass collisions and a very high rate of glass breakage. This is undesirable because of the potential of harm to human operators, because of the difficulty of extracting the broken material, and because of the creation of a significant amount of non-recoverable waste in the form of small glass particles.

SUMMARY OF THE INVENTION

The invention is based on the inventor's critical observation that positioning a trommel to receive the input flow of recyclable matter advantageously agitates the input flow, thereby reducing its density, and the further observation that an endless magnetic belt positioned at the output of the trommel effectively separates magneto-responsive articles from the agitated input flow. The inventor's third critical observation was that provision of baffles significantly reduced the velocity, the article-to-article impact and, therefore, the breakage of vertically-falling glass articles in an air separator.

These critical observations have resulted in the invention of a machine for separating recyclable matter.

The machine includes:

- a frame;
- a trommel mounted to rotate on the frame, the trommel having an input opening and an output opening for conducting a low of recyclable matter;
- an endless magnetic belt coupled to the trommel for extracting magnetic material from the flow of recyclable matter in response to rotation of the trommel;
- a positive-pressure air separator mounted on the frame adjacent the trommel for:
  receiving the flow of recyclable matter; and
  separating the flow of recyclable matter into a first material stream including relatively lightweight articles and a second material stream including relatively heavier articles;
- the air separator providing the second material stream in a substantially downward direction;
- padded baffles in the separator for reducing the downward velocity of articles in the second material stream;
- a first collection area;
- a first conveyor mounted on the frame adjacent the air separator to receive the first material stream for conveying the relatively lightweight articles to the first collection area;
- a second collection area; and
- a second conveyor mounted on the frame adjacent the baffles to receive the second material stream for conveying the relatively heavy articles to the second collection area.

With this invention, magneto-responsive articles are easily removed from the flow of recyclable matter to a significantly reduced accompaniment of other articles. The invention also effectively separates relatively lightweight articles from heavier glass articles with an unexpected and surprising reduction in glass breakage.

These benefits, and other features and advantages of the invention will be appreciated when the following detailed description is read with reference to the below-described drawings.

BRIEF DESCRIPTION OF THE DRAWINGS

FIG. 3 is a front elevational view of the machine of FIG. 1.

FIG. 4 is a front elevational view of the machine of FIG. 1 on an elevated mezzanine.

FIG. 5 is a side elevational view of the machine of FIG. 4.

FIG. 6 is a magnified partial side elevational view of a trommel and magnetic separator in the machine of FIG. 1.

FIG. 7 is a perspective view along the trommel of FIG. 6 from its front end.

FIG. 8 is a elevational view of the front end of the trommel of FIG. 6.

DETAILED DESCRIPTION OF THE PREFERRED EMBODIMENT

Figure 1:
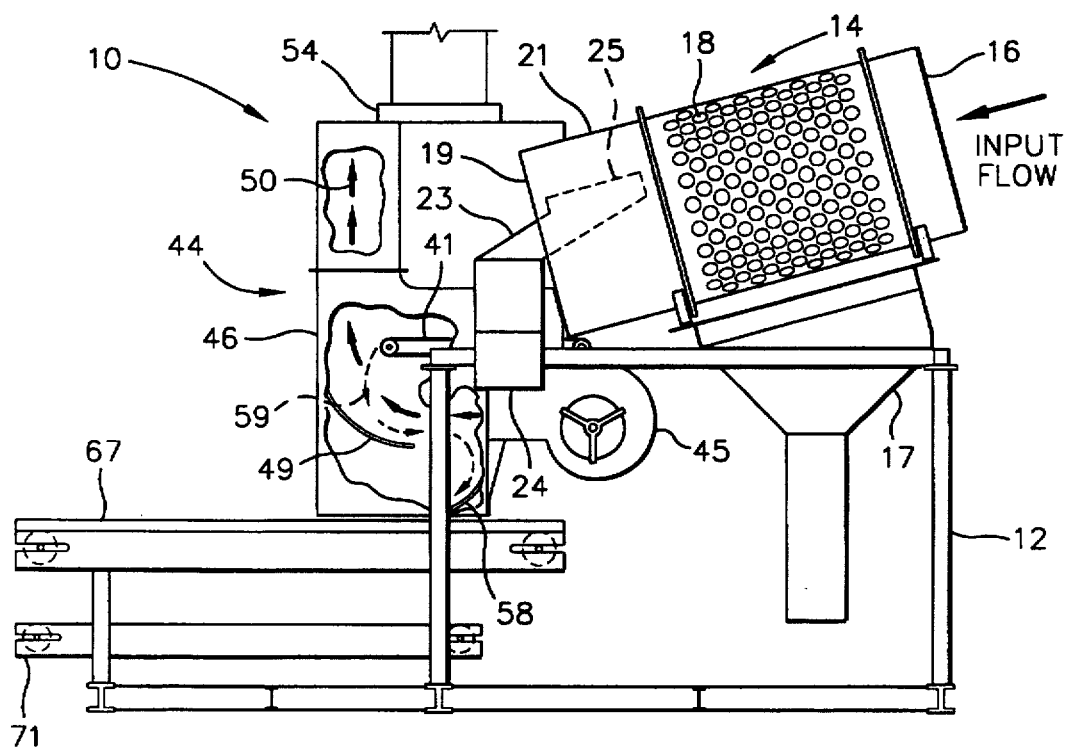
FIG. 1 is a side elevational view, partially cut away, of a machine which separates recyclable matter according to the invention.
Figure 2:
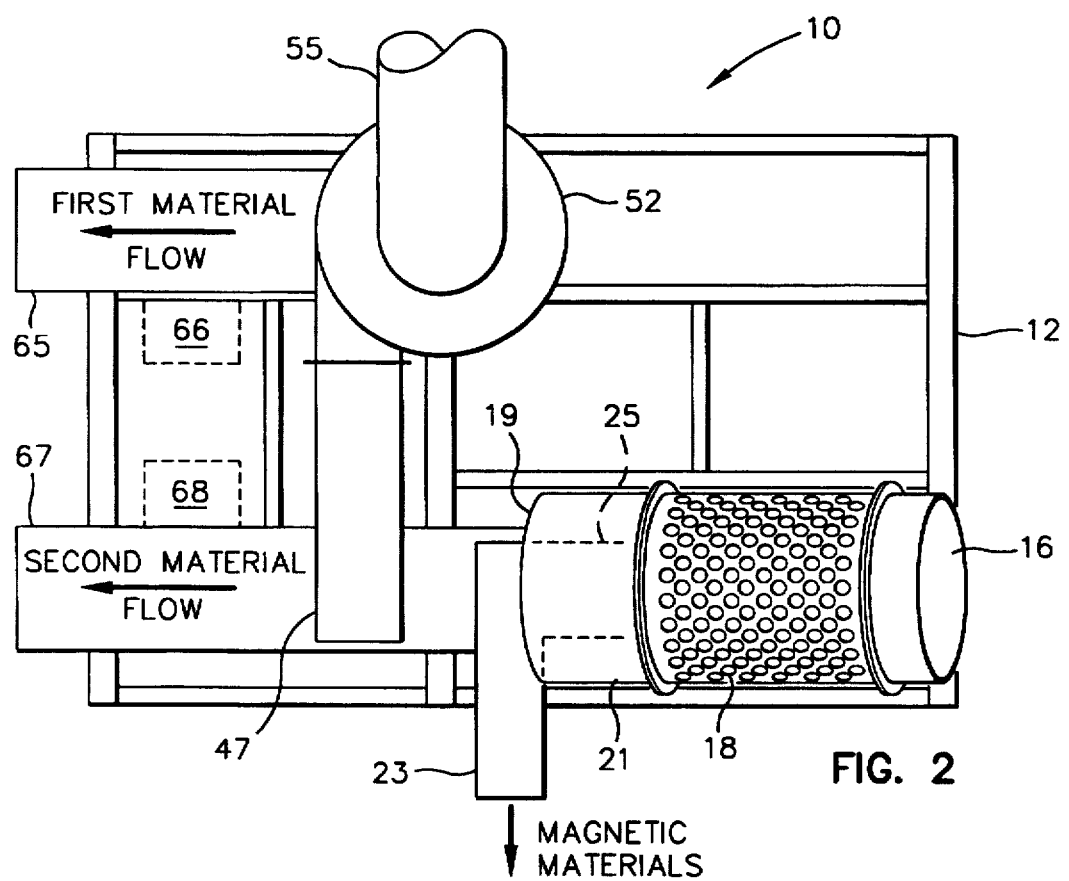
FIG. 2 is a plan view of the machine of FIG. 1.

The present invention is a machine for separating recyclable matter, a preferred form of which is shown in FIGS. 1–3. The machine is referred to generally by reference numeral 10, and it includes a frame 12 on which a trommel 14 is rotatably mounted. The trommel 14 includes an open input end 16 into which an input flow of recyclable matter is provided by conventional means which are not shown, but which can include, for example, a hopper and an upwardly-extending conveyor. The trommel 14 is rotatably mounted by conventional means on the frame 12 and rotates thereon to agitate and loosen the input flow of recyclable matter. At the same time non-recyclable waste in the form of relatively small particles is separated from, and screened out of, the agitated input flow through the perforations 18 in the side surface of the trommel. This waste is collected and conducted from the trommel through a chute 17 positioned on the frame 12, underneath the trommel. The trommel is mounted at a slant so that its open discharge end 19 is relatively lower than its input end 16. The discharge end 19 of the trommel is the lower periphery of an unapertured annulus 21 between the apertures 18 and the discharge end 19. Magneto-responsive materials are extracted from the agitated, screened input flow in this annulus 21 and are received in a chute 23 having a receiving end 25 that projects through the discharge end 19 into the annulus 21. The mechanism or extracting the magnetic materials from the agitated, screened input flow is illustrated in FIGS. 6, 7, and 8.

The mechanism for extracting magneto-responsive articles (also referred to as "magnetic" articles) includes a magnetic endless belt mechanism 30 that includes a pair of parallel endless belts 31. The belts are, preferably, assembled from metallic links that are durable enough to support and carry a plurality of elongate bar magnets 35 which are coupled to the endless belts 31. The magnetic endless belt mechanism passes around the annulus 21 and a belt roller 37 which is spaced from the trommel 14. As best seen in FIGS. 7 and 8, the belt roller 37 includes two teethed portions which engage the links and the endless belts 31. The magnetic endless belt mechanism 30 is tensioned between the belt roller 37 and the annulus 21 so that the belt mechanism is in driving engagement with the trommel 14. The magnetic endless belt mechanism may either idle on the trommel 14 as the trommel is rotated by means which are well-understood but not illustrated, or it may be used to drive the trommel, assuming a suitable means (not shown) for driving the belt roller 37.

In operation, the trommel 14, magnetic endless belt mechanism 30, and drive roller 37 all rotate together. Assuming rotation in the direction indicated by the arrow 39 in FIG. 8, magnetic articles in the agitated, screened input flow of recyclable matter are attracted by the magnets 35 whose fields extend through the inner surface of the annulus 21. The magnetic articles are held against the inner surface of the annulus 21 until they reach the location indicated by the article 40. At this locations the magnetic endless belt mechanism 30 disengages from the annulus 21, which quickly reduces and soon eliminates the magnetic field which holds the magnetic article 40 against the inner surface of the annulus. When this occurs, the magnetic article 40 drops along the path indicated by the dotted arrow 42 and is received in the end 25 of the chute 23. The chute 23 conducts the magnetic article 40 to an exit point 24 where the article drops out of the chute into a collection bin (not shown) The inventor contemplates that other mechanisms could serve the function of the chute 23 in receiving and conducting away magnetic articles from the trommel 14. For example, out feed from the trommel could be by way of a conveyor parallel to the trommel and mounted to extend part way into the annulus 21.

Returning to FIGS. 1, 2, and 3, the materials in the input flow of recyclable matter which do not respond to the magnetic endless belt mechanism fall out of the discharge end 19 of the trommel 14 onto a conveyor 41. These materials are provided by the conveyor 41 to an air separator 44.

The air separator 44 includes a continuous closed duct with a lower section 46 (which is shown partially cut away in FIG. 1 for purposes of illustration) As best seen in FIGS. 2 and 3, the lower duct section 46 transitions to a closed upper section 47. The air separator 44 includes a high-capacity blower 45 which communicates with the duct 46, 47, blowing a high velocity stream of air at a positive pressure into the lower duct. The stream of air is deflected upwardly in the duct 46 by a baffle 49. The high-velocity air stream continues upwardly in the chute section 46 along the path indicated by the solid arrows 50. The high-velocity air stream is conducted through the upper chute section 47 to a cyclone mechanism 52 with an upper exit port 54 and a lower exit port 56.

In operation, the air separator receives the agitated, screened input flow or recyclable matter from which magnetic materials have been removed. The flow falls off the end of the conveyor 41 into the lower duct section 46.

As the flow of matter falls vertically toward the baffle 49, it is further agitated by the high velocity air stream so that relatively light articles such as plastic and aluminum containers, other plastic articles, and paper articles are transported by the stream of air in a first material stream upwardly in the lower duct 46 through the upper duct 47 into the cyclone 52. The cyclone 52 operates conventionally, circulating the stream of air and condensing it at its lower end so that an upwardly moving, low pressure area is formed in the center of the cyclone which conducts very light material such as plastic bags, sheets of paper, and so on, from the first material stream to the upper output port 54 while heavier articles, such as plastic and aluminum containers are thrown to the wall of the cyclone 52 and fall downwardly along the wall through the output port 56. Preferably, a duct 55 connected to the upper output port 54 conducts the very light materials from the cyclone 52 to a collection area (not shown).

Returning to FIG. 1, the high velocity stream of air is not sufficiently powerful to propel heavier articles, such as glass containers, upwardly in the lower chute 46. Consequently, these articles fall downwardly off the end of the conveyor 41, forming a second stream or relatively heavier articles. The downward velocity and the impact force of articles in the second material stream are reduced by the baffle 49 and a second baffle 58. As shown in the cross-section of FIG. 1, the baffles 49 and 58 are curved in such a manner that articles in the second material stream follow the path indicated by the dashed arrows 59, falling first to the first baffle 49 where their downward fall is intercepted and translated horizontally and wherefrom the articles fall to the second baffle 58, which again translates the falling direction of the articles into a substantially horizontal direction. Preferably, the baffles 49 and 58 are padded with a hardy resilient material which will absorb much of the force of impact produced when articles fall against the baffles. The padded baffles 49 and 58 significantly reduce the breakage of articles in the second material stream.

As FIGS. 2 and 3 illustrate, the first and second material streams are directed to spaced-apart, substantially parallel conveyors 65 and 67 which are conventionally mounted and conventionally driven on the frame 12. The air separator upper duct 47 extends transversely above these conveyors between the lower duct section 46 and the cyclone 52. The conveyor 65 receives the relatively heavier articles in the first material stream which fall out of the exit end 56 of the cyclone 52 and conduct those articles past a sorting location 66 where a human operator may stand and visually classify and manually sort articles in the first material stream. Similarly, the second conveyor receives articles in the second material stream, conveying them past a sorting location 68.

As FIGS. 1 and 2 illustrate, the lower baffle 58 in the air separator 44 horizontally translates the direction of articles falling downwardly in the lower duct section 46 into a direction parallel with the direction of movement of the conveyors 65 and 67. This places the articles on the conveyors and contributes significantly to reduction of breakage.

A respective conveyor is positioned beneath each of the conveyors. 69 and 67. These conveyors, 70 and 71, are provided to receive trash and other non-recyclable objects which may be carried with the first and second material streams. Such objects would be manually removed by the human operators positioned at the sorting locations.

FIGS. 4 and 5 illustrate a second embodiment of the invention in which the separator machine described above and indicated generally by reference numeral 80 in these two figures is mounted on a raised mezzanine 90. In this embodiment, the mezzanine 90 elevates the sorting machine 80 above floor level 92. The input flow of recyclable matter fed to the trommel 80a is provided from an input hopper 95 from which it is raised to the input end of the trommel 80a by an upwardly-inclined conveyor 97. As shown in FIGS. 4 and 5, the first and second material stream conveyors 80b and 80c pass sorting locations which are served by sorting chutes, such as the chutes 98 and 99.

The embodiment of FIGS. 1, 2, and 3 is intended to be a relatively portable one, easily stored, transported and assembled, and then easily disassembled for relocation. The second embodiment illustrated in FIGS. 4 and 5 is intended to be a relatively permanent installation adapted for high-speed, high-volume separation assisted by a plurality of human operators. Obviously, many variations of the above-described embodiments will occur to one skilled in the art and such, variations may be made without departing from the spirit and scope of the claims which follow.

I claim:

1. A method for separating magnetic materials from a stream of matter using a magnetic separator that includes a frame, an apertured trommel rotatable in the frame and having input and output ends, an annulus near the output end, and a plurality of permanent magnets arrayed around the annulus to rotate with the trommel, the method comprising:

rotating the trommel;

conducting a heterogeneous stream of material through the trommel from the input end to the output end;

separating material from the stream of material by passing the stream of material over apertures in the trommel;

bringing permanent magnets of the plurality of the permanent magnets into contact with an outer surface of the annulus such that each permanent magnet rotates with the unapertured annulus;

as each permanent magnet rotates with the unapertured annulus, disengaging the permanent magnet from contact with the annulus when the permanent magnet rotates past a disengagement location;

receiving magnetic articles from the heterogenous stream of material when they are released by disengagement of permanent magnets from contact with the annulus at the disengagement location;

conducting the stream of material with the magnetic materials removed from the output end to an air separator; and separating light materials from the stream of material using the air separator.

2. The method of claim 1, wherein separating light materials using the air separator includes substantially vertically separating relatively light articles from the heterogenous stream of materials at the air separator.

3. The method of claim 2, further including:

conducting the relatively light articles to a collection location;

conducting magnetic articles from the trommel to a collection location; and conducting the heterogenous stream of material with the magnetic articles and light articles removed to a collection location.

* * * * *